United States Patent [19]

Taylor

[11] Patent Number: 5,005,783

[45] Date of Patent: Apr. 9, 1991

[54] VARIABLE GEOMETRY AIRSHIP

[75] Inventor: James D. Taylor, Cambridge, Mass.

[73] Assignee: The United States of America as represented by the Secretary of the Air Force, Washington, D.C.

[21] Appl. No.: 466,888

[22] Filed: Jan. 18, 1990

[51] Int. Cl.$^5$ .............................................. B64B 1/58
[52] U.S. Cl. ...................................... 244/97; 244/25; 244/5; 244/96
[58] Field of Search .................. 244/25, 5, 29, 97, 125, 244/98, 99, 96

[56] References Cited

U.S. PATENT DOCUMENTS

| | | | |
|---|---|---|---|
| 3,227,400 | 1/1966 | Stahmer | 244/29 |
| 3,669,367 | 6/1972 | Rhodes et al. | 244/46 |
| 3,876,265 | 8/1976 | Doolittle | 244/2 |
| 3,907,218 | 9/1975 | Miller | 244/5 |
| 3,913,871 | 10/1975 | Miller | 244/5 |
| 3,970,270 | 7/1976 | Pittet, Jr. | 244/5 |
| 3,993,268 | 11/1976 | Moore | 244/5 |
| 4,012,016 | 3/1977 | Davenport | 244/125 |
| 4,052,025 | 10/1977 | Clark et al. | 255/5 |
| 4,085,912 | 4/1978 | Slater | 244/25 |
| 4,102,519 | 7/1978 | Crosby, Jr. | 244/125 |
| 4,261,534 | 4/1981 | Roselli | 244/22 |
| 4,366,936 | 1/1983 | Ferguson | 244/2 |
| 4,482,110 | 11/1984 | Crimmins, Jr. | 244/26 |
| 4,497,272 | 2/1985 | Veazey | 114/103 |
| 4,667,898 | 5/1987 | Greenhalgh | 244/46 |
| 4,695,012 | 9/1987 | Lindenbaum | 244/26 |
| 4,779,825 | 10/1988 | Sams | 244/153A |
| 4,838,501 | 6/1989 | Judson | 244/29 |
| 4,850,551 | 7/1989 | Krawetz | 244/25 |

*Primary Examiner*—Joseph F. Peters, Jr.
*Assistant Examiner*—Christopher P. Ellis
*Attorney, Agent, or Firm*—William G. Auton; Donald J. Singer

[57] ABSTRACT

A variable geometry lighter-than-air craft which can change from a buoyant airship to a heavier-than-air craft by changing shape. The craft has a flexible envelope filled with helium or other lifting gas. Releasing or tightening the adjusting lines changes the envelope shape by adjusting the internal dimensions and extending or withdrawing wing expansion sections. The craft's shape can change from an ovoid shape for lighter-than-air flight to a winged shape for heavier-than-air flight. Controlling the craft's speed and trim regulates the aerodynamic lift.

20 Claims, 6 Drawing Sheets

VARIABLE GEOMETRY AIRSHIP

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to aircraft, and more specifically the invention pertains to a variable geometry lighter-than-air craft which can change from a buoyant airship to a heavier-than-air craft by changing shape. The craft has a flexible envelope filled with helium or other lifting gas. Releasing or tightening the adjusting lines changes the envelope shape by adjusting the internal dimensions and extending or withdrawing wing expansion sections. The craft's shape can change from an ovoid shape for lighter-than-air flight to a winged shape for heavier-than-air flight. Controlling the craft's shape regulates the buoyant lift. Controlling the craft's speed and trim regulates the aerodynamic lift.

Since time immemorial, man has sought to design and build the optimum flying machine. Reduction of moving parts is part of such optimization. During the Middle Ages, various inventors designed apparatus which they felt would achieve the objective of enabling an to fly. It has, however, only been within the last 100 years that significant progress has been made toward developing viable aircraft.

Basically, flying craft can be divided into one of two types: lighter-than-air devices and heavier-than-air devices. Developments came earlier with regard to the former type of craft. Such a vehicle is provided with a bladder or balloon which can be filled with a gas having a specific gravity less than that of air. This type of craft is an application of Archimedes' principle which states that a body immersed in a fluid is bouyed up by a force equal to the weight of the liquid it displaces. If the weight of the fluid displaced is greater than the weight of the body, the body will "float" on the fluid. Zeppelins and hot air balloon recreational craft are illustrative of this type of vehicle.

Heavier-than-air craft, on the other hand, function because of Newton's third law of motion and Bernoulli's principle. Newton's third law of motion states that, for every action, there is an equal and opposite reaction. A helicopter is a heavier-than-air craft illustrating the application of this law. As the main rotor of a helicopter rotates, the pitch of the blades will cause the exertion of a force upon the air through which the rotor cuts. As a consequence, an equal and opposite force will be exerted upon the rotor blades as they rotate. This force will, in view of the pitch of the rotor blades and the direction in which the rotor rotates, urge the helicopter upwardly.

Lighter-than-air vehicles can remain aloft indefinately and are capable of touching down in areas which would be inaccessible for most other conventional transport vehicles. They can be powered by a simple propeller engine and refueling can be accomplished either directly from the ground or by means of a simple umbilical cord from another aircraft.

People have been reticent since the later 1930's to pursue flight by lighter-than-air vessels, after the "Hindenburg" was mysteriously and spectacularly consumed by flames. However, recent developments require airborne platforms for large sensor, systems such as phased array radars operating at frequencies between 0.5 and 2 GHz. For air surveillance and tracking, this means large antennas about 60 ft by 200 feet in size. All directional coverage requires at least three such antennas oriented at 120 degrees from each other.

Operational requirements for such systems indicate that the platform must be able to remain on station for over 24 hours. A low speed platform can enhance low altitude radar target detection in clutter. However, operational flexibility requires a higher speed dash capability. Altitude requirements range from 10,000 feet to 45,000 feet for adequate radar coverage against low altitude.

Solutions to the large, long endurance airborn platform problem include:
large aircraft (e.g. Boeing 747, C-5, C-17, etc.);
aerobody (flying wing or lifting body) aircraft; and
airships (dirigibles, blimps, etc.). However each has some disadvantages, explained below.

Large aircraft cannot carry the three large phased array radar antennas required for all directional surveillance. They also must operate at high speeds which is undesirable for clutter suppression. They have limited endurance.

Aerobody aircraft are a solution to carrying three large antennas by enclosing them in an airfoil. However, aerobodies need higher airspeeds at high altitudes, which limits their endurance. Aerobodies do not have good lift to drag ratios compared to conventional aircraft.

Airships can carry large size phased array antennas and have good endurance at low speeds and altitudes. They are limited in altitude by their weight and volume because they are buoyant. Practical airship altitudes are limited to about 15,000 feet and maximum air speed is limited to about 100 knots.

The variable geometry airship is a way to change an airship into an aircraft which is supported by both buoyancy and aerodynamic lift, sometimes called a hybrid LTA aircraft. Changing shape permits higher aircraft speeds and better altitude at the expense of endurance.

The task of providing a variable geometry airship which can change from a fully buoyant airship into winged aircraft while in flight is alleviated, to some extent, by the systems disclosed in the following U.S. Patents, the disclosures of which are specifically incorporated herein by reference:
U.S. Pat. No. 3,907,218 issued to Miller;
U.S. Pat. No. 3,913,871 issued to Miller;
U.S. Pat. No. 3,970,270 issued to Pittet;
U.S. Pat. No. 3,976,265 issued to Doolittle;
U.S. Pat. No. 3,993,268 issued to Moore;
U.S. Pat. No. 4,052,025 issued to Clark et al;
U.S. Pat. No. 4,085,912 issued to Slater;
U.S. Pat. No. 4,102,519 issued to Crosby;
U.S. Pat. No. 4,261,534 issued to Roselli;
U.S. Pat. No. 4,366,936 issued to Ferguson;
U.S. Pat. No. 4,482,110 issued to Crmmins;
U.S. Pat. No. 4,497,272 issued to Veazey;
U.S. Pat. No. 4,695,012 issued to Lindenbarium; and
U.S. Pat. No. 4,779,825 issued to Sams.

The Miller patents disclose heavier-than-air aircraft that have lighter than air compartments. The Pittet patent discloses a low speed aircraft with an airfoil capable of serving as a lighter-than-air system or a heavier-than-air system.

The Doolittle reference disclosed a semibuoyant composite aircraft that resembles a helicopter with a rotating balloon sphere encompassing the axis of its rotors. The Moore patent is a ballooned stol aircraft.

The semi-buoyant aircraft of the Clark et al. patent is a fixed-wing aircraft which encloses pressurized buoyant cells. The Slater patent discloses a convertible airship with rotataly mounted wing structures.

The Crosby patent discloses a variable lift inflatable airfoil for tethered balloons. The Roselli patent resembles that of Crosby in that it disclosed an inflated wing aircraft.

The Ferguson patent discloses an aircraft which uses a spherical balloon which is pressurized to prevent its changes in geometry. The Crimmins patent discloses a cyclorotor composite aircraft which uses a combination of a lighter-than-air compartment (for bouyant lift) and a system of rotating airfoils to provide lift.

The Veazey references disclosed a system of inflatable mastless sails which are used on a boat or a ship. The Lindenbaum patent discloses an aerial load-lifting system which used a lighter-than-air blimp with a heavier-than-air helicopter system. The Sams patent describes a propelling rotor which may be rotated about an axis. The Veazey, Lindenbaum and Sams patents are included because they provide descriptions of the technology which may be used by the present invention the details of which are discussed in the detailed description that follows.

While the above cited references are instructive, there remains a need for a variable geometry lighter-than-air craft which can change from a buoyant heavier-than-air craft by changing shape. The present invention is intended to satisfy that need.

SUMMARY OF THE INVENTION

The present invention is a variable geometry airship which can fly either as a lighter-than-air (LTA), fully buoyant, or hybrid LTA, partially buoyant, aircraft by changing shape. One embodiment of the craft has a flexible envelope filled with helium or other lifting gas. Releasing or tightening the adjusting lines changes the envelope shape by adjusting the internal dimensions and extending or withdrawing wing expansion sections. The craft's shape can change from an ovoid shape for lighter-than-air flight to a winged shape for heavier-than-air flight. Controlling the craft's shape regulates the buoyant lift. Controlling the craft's speed and trim regulates the aerodynamic lift.

The provision of a variable geometry lighter-than-air craft which can change from a buoyant airship to a heavier-than-air craft by changing shape is accomplished using: a rigid airship frame, a crew cab fixed to the airship frame, a horizontal stabilizer canard wing, a propulsion system, a vertical tail, a flexible gas envelope, two flexible wing expansion sections, wing spars (optional), a catenary curtain, adjusting lines, and a control servomechanism.

Many of the elements of the aircraft function conventionally. These elements include the rigid aircraft frame, the crew cab, the canard wing, and the propulsion system. The variable geometry aspect of the airship is provided by the shape of the flexible gas envelope, the two flexible wing expansion sections, the wing spars, the catenary curtain, the adjusting lines, and the control servomechanism. These elements are described briefly below.

The successful operation of the present invention depends largely on the correct design pattern selected for the flexible gas envelope. More specifically, the design pattern should be determined by selecting a pattern which reflects the geometry of the desired winged aircraft shape which will have sufficient lift to accomplish heavier-than-air flight. The reason that the airplane shape is considered critical when preparing the flexible gas envelope is as follows. The lighter-than-air ovoid shape is easily accomplished by allowing the main adjusting lines to become flaccid and retracting the wing spars. A successful buoyant airship requires that the volume of the lifting gas (helium) be sufficient to generate the lift to carry the airship frame and crew cab. The winged aircraft shape is a little more complex because of the importance of the generating a higher aerodynamic lift while maintaining a reduced buoyant lift. Conversion of the airship from a buoyant airship is a partially buoyant aircraft is accomplished as lines inside the airship extend the wings and change the envelope shape. The wings can be extended in a number of ways. First, a mechanical pair of wing spars can be extended. These wing spars include a pair mechanical wing frame sections which are pivotally connected to the rigid airship frame, and which are enclosed in the flexible wing expansion sections. For wing deployment, the wing spars are pivoted into a position such that the wings are extended, and so the flexible wing expansion sections become inflated wings.

A second way that the airship can use to change geometry is accomplished without the use of mechanical wing spars. In this method, the flexible envelope has a shape which is controlled by a catenary curtain, adjusting lines, and the servomechanism system.

The catenary curtain is a wire mesh that attaches the flexible gas envelope to both the rigid airship frame, and to the adjusting lines. As the adjusting lines are pulled to predetermined positions, the catenary curtain can gently adjust the envelope to cause the geometry to change from the buoyant ovoid shape, into a partially buoyant aircraft with a wing configuration.

As the adjusting lines are pulled by the motors of the servomechanism, the wing configuration is accomplished as the flexible wing expansion sections are extended, and the pressure of the buoyant gas is increased to keep the inflated wings rigid. In one embodiment of the invention the wing configuration is an inflated delta wing configuration which a shape resembling that of early hang gliders.

The servomechanism system includes a set of electric motors which are attached to the rigid airship frame and which extend and retract the adjusting lines. The control over these electric motors does not need to be too elaborate if the adjusting lines have been cut to an exact length so that they present only two alternatives: fully extended and fully retracted. Users of the present invention can determine the appropriate length of each adjusting line empirically depending upon the aircraft's particular shape, or they can adjust each individual electric motor's operation to incrementally adjust the length of each adjusting line until the desired configuration is achieved.

The variable geometry airship is a potential airborne platform. Large sensors or communications systems can use the variable geometry airship's large physical size. The variable geometry airship has buoyant low speed and high speed flight modes. It can fly at low speeds and low altitudes for long periods. Changing shape to a winged aircraft permits quick movement to new locations or higher altitudes. Civilian missions for the invention can include sea and coastal patrol, border surveillance and ocean rescue.

It is a principal object of the present invention to provide a variable geometry lighter-than-air craft which can change from a bouyant airship to a heavier-than-air craft by changing shape.

It is another object of the present invention to provide a hybrid aircraft that can conserve fuel due to its buoyance, yet convert to a heavier-than-air craft to operate at higher speeds when required.

These together with other objects, features and advantages of the invention will become more readily apparent from the following detailed description when taken in conjunction with the accompanying drawing wherein like elements are given like reference numerals throughout.

DETAILED DESCRIPTION OF THE PREFERRED EMBODIMENT

The present invention includes a variable geometry lighter-than-air craft which can change from a buoyant airship to a heavier-than-air craft by changing shape. The reader's attention is now directed towards FIGS. 1A and 1B which are illustrations of the present invention which respectfully depict the present invention in the airship configuration and the aircraft configuration.

Figure 1A:
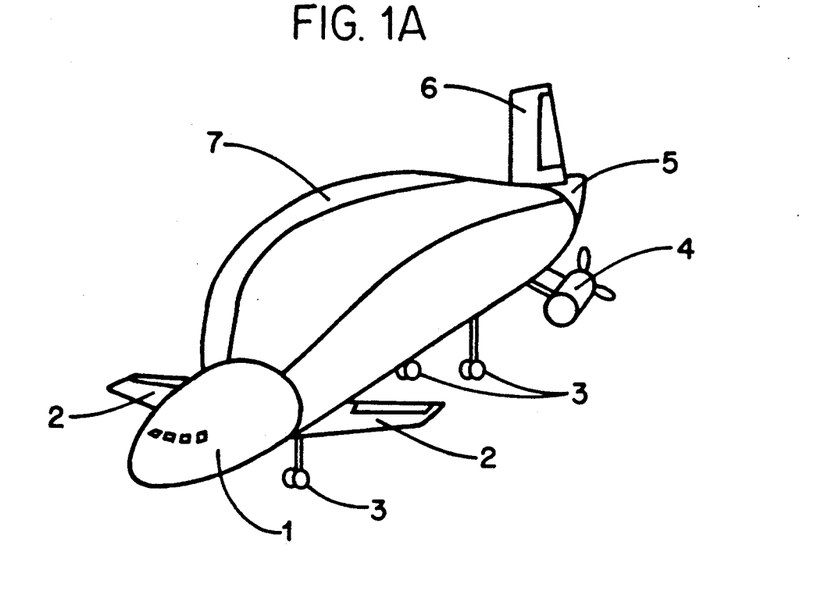
FIG. 1A is an illustration of the present invention in the airship configuration.
Figure 1B:
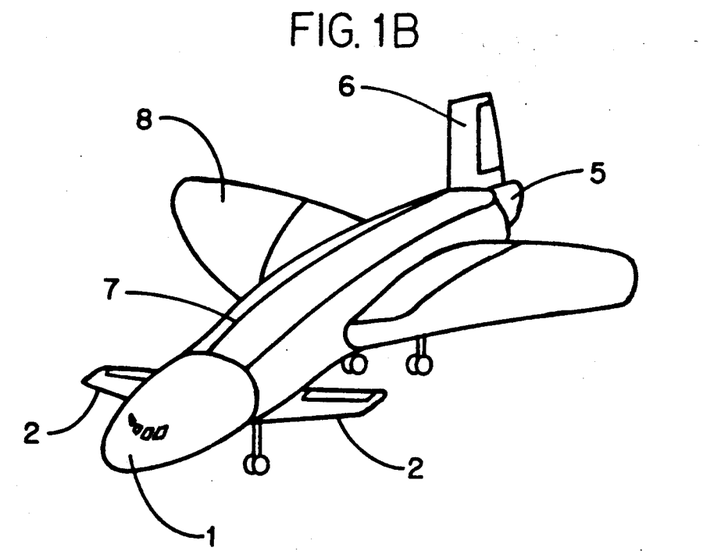
FIG. 1B is an illustration of the present invention in the aircraft configuration.

The system of FIGS. 1A and 1B includes: a crew cab and rigid airframe 1, a horizontal stabilizer with pitch and roll surfaces 2, a retractable landing gear 3 an engine, propellor and pylon assembly 4, a rigid tail cone 5, a vertical tail rudder 6, a flexible gas envelope 7, and flexible wing expansion sections 8. Many of these elements operate conventionally. More specifically, the crew cab 1, the engine propellor and pylon assembly 4, landing gear 3, and the tail rudder 6 are well known airship subsystems that need not be described in detail. The other aspects of the system of FIGS. 1A and 1B are described below.

As mentioned above, the illustration in FIG. 1A depicts the invention when it is in the airship configuration. This means that the flexible envelope 7 is allowed to assume the conventional ovoid shape of a blimp, and that the craft is acting as a lighter-than-air craft. Here, it has all of the attributes of a conventional airship.

An airship achieves most of its lift from the lighter-than-air gas it contains, but additional lift is also obtained from aerodynamic forces acting on the vehicle when it is moving through the air at an angle of attack (angle between the axis of the airship and the flight path).

The two most frequently used airship gases are hydrogen and helium; hydrogen gives the greater lift (about 68 lb/1000 cubic foot versus 62 lb/cubic foot for helium with gases of ordinary purities). Helium is the safer to use because it is nonflammable. Characteristics of several conventional airships are listed below in Table 1.

TABLE 1

| Lifting gas | Gas volume, ft | Length, ft | Diam., ft | Gross lift, lb | Engs., no. |
|---|---|---|---|---|---|
| Helium | 2,148,000 | 680 | 79 | 127,000 | 5 |
| Hydrogen | 2,760,000 | 699 | 85 | 178,000 | 6 |
| Hydrogen, helium | 2,600,000 | 660 | 91 | 168,000 | 5 |
| Helium | 6,850,000 | 785 | 133 | 403,000 | 8 |
| Helium | 6,850,000 | 785 | 133 | 403,000 | 8 |
| Hydrogen | 3,900,000 | 776 | 100 | 260,000 | 5 |
| Hydrogen | 7,060,000 | 814 | 135 | 455,000 | 4 |
| Helium | 527,000 | 266 | 69 | 32,000 | 2 |
| Helium | 650,000 | 285 | 68 | 39,000 | 2 |
| Helium | 975,000 | 343 | 75 | 58,600 | 2 |
| Helium | 1,465,000 | 403 | 85 | 83,000 | 2 |

When the present invention is operated as an airship, it can have any of the dimensions and characteristics listed in Table 1, but it is not limited to these characteristics. Since helium is recommended for use, the flexible gas envelope should have sufficient volume to lift the anticipated payload at the rate of about 1,000 cubic feet for each 62 pounds of payload. However in actual operation, only 90% of the weight is actually lifted by the buoyant gas. The remainder of the lift is generated by the application of Bernoulli's principle as air flows over the curve of the ovoid shape of the blimp.

Additionally, typical transport aircraft have a mass that ranges between 100 thousand and 600 thousand pounds. Therefore, the gross weight requiring lift may be as small as six thousand pounds, or may range up to six hundred thousand pounds, depending upon the design and application selected.

As mentioned above, most nonrigid airships are actually semi-buoyant vehicles with at least 10% of their lift derived by the application of Bernoulli's principle. In FIG. 1B, the aircraft is also semi-buoyant, but it allows even more of its lift to be generated by the use of flexible wing expansion sections 8.

As mentioned above, a conventional fixed wing aircraft illustrates the application of Bernoulli's principle in combination with Newton's third law of motion. The principle states that, as a fluid is caused to be moved over a surface, the pressure upon the surface will be reduced below ambient pressure. In the case of the fixed wing aircraft, the curvature of the upper surface of an airfoil, or wing, is such that the distance which air that is attacked by a forward edge of the airfoil travels in passing above the foil is greater than that travelled by air passing below the foil. In order to meet and merge properly with air at the rear edge of the foil, therefore, the air passing above the airfoil will travel at a greater velocity than that passing beneath. Consequently, the pressure exerted upon the upper surface will be less than that exerted upon the lower surface of the foil. This differential in pressures creates the lift necessary to cause the airplane to fly.

Figure 2:
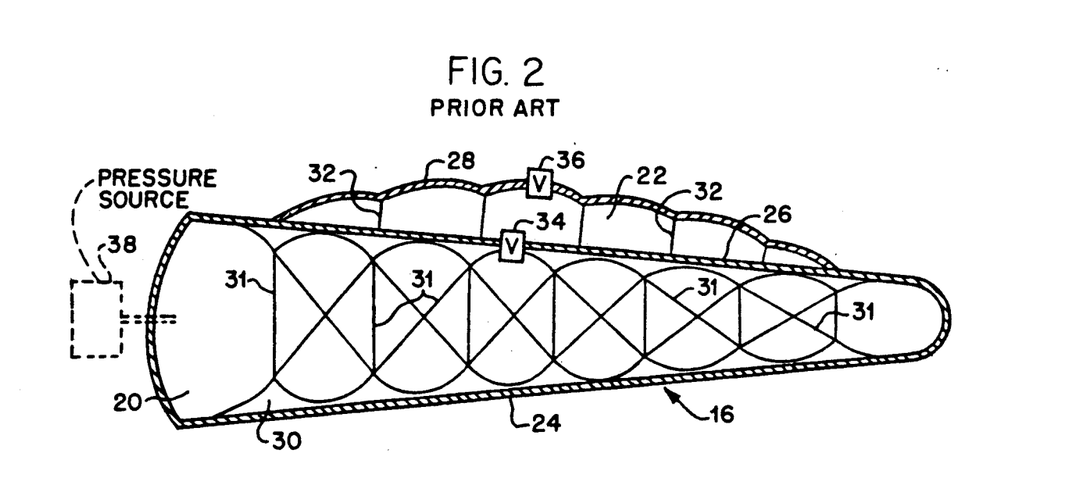
FIGS. 2 and 3 are illustrations of the inflatable airfoil of the Crosby patent.
Figure 3:
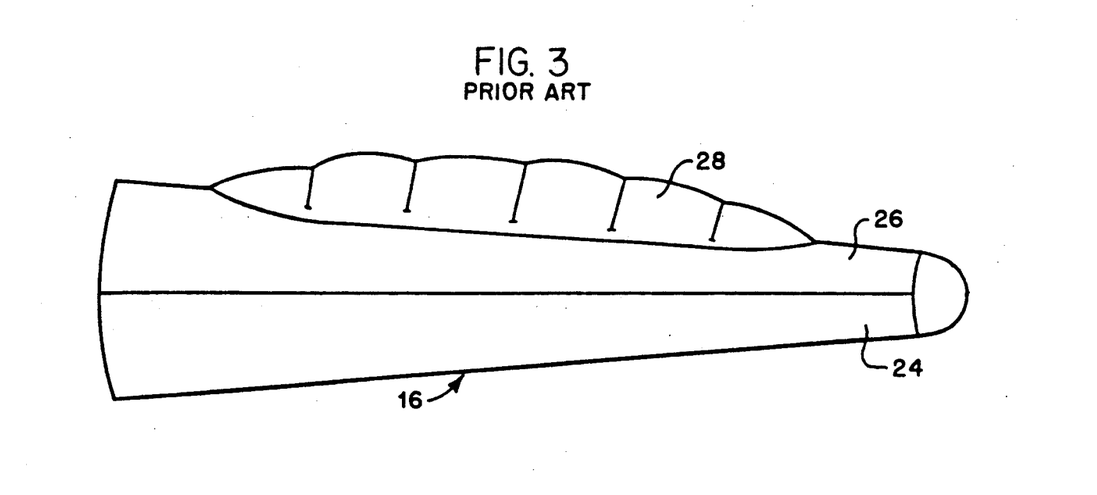

There exists a variety of forms that the wing expansion sections can take while serving in the system of the present invention. For example, both the above-cited Roselli and Crosby patents present systems of inflatable airfoils which may be used in the present invention. For example, FIGS. 2 and 3 are illustrations of the variable left inflatable airfoil of the Crosby reference. The wing of FIG. 2 is made of a primary chamber 20 and a secondary or lift chamber 22 mounted thereon. Chamber 20 is defined by a pair of upper and lower non-rigid, gas retaining skin-like members or membranes 24 and 26, respectively, while secondary or lift chamber 22 is defined by membrane 26 and gas retaining non-rigid member or membrane 28 which is attached to the outer surface of membrane 26. Although chambers 20 and 22 may be filled with any suitable gas, generally the instant invention utilizes air as the gas for inflating chambers 20 and 22. Membranes 24, 26 and 28 are made of any conventional air ship or balloon fabric material which is capable of assuming a standard airfoil configuration. In addition, this material is capable of stretching quite readily on one direction and relatively little in the other. Such a fabric, for example, tricot, is generally coated with an elastic, gas-retaining compound which may be light-stable, low durometer polyurethane. While the resistance to stretch of the coated fabric will be greater and its maximum elongation will be less than prior to the coating, membranes 24, 26 and 28 are still sufficient for utilization within the instant invention. In general, the stretch axis of membranes 24, 26 and 28 run in the chordwise direction.

Situated within primary chamber 20 are a plurality of spanwise spars 30. Although any number of spanwise spars 30 may be utilized with this invention, optimum results arise with utilization of between eight and fifteen such spars. Spars 30 are constructed of a lightweight, square weave cloth material of sufficient strength to maintain membranes or members 24 and 26 in the desired position. In addition, spars 30 are also porous to allow air to pass there through. Additional strength in provided to spars 30 by the use of lightweight cloth laces 31. Spars 30 stabilize chamber 20 during inflation and basically maintain the outer airfoil configuration of fin 16 by connection between the inner surfaces of lower and upper membranes 24 and 26, respectively.

Located above and secured to the outer surface of membrane 26 of primary chamber 20 is secondary or lift chamber 22 which contains therein a plurality of ribs 32. Ribs 32 are made of any suitable porous lightweight cloth material which runs in the chordwise direction between the inner surface of membrane 28 of chamber 22 and the outer surface of membrane 26 of chamber 20. Chamber 22 is generally of a planform configuration being reduced in span to the trailing edge of airfoil 12 in order to increase the chamber radius of its inflated thickness. Reduction of this radius decreases the hoop tension which, in turn, decreases the steepness of its curvature, thus minimizing the discontinuity where it is attached to the outer surface of membrane 26 of primary chamber 20.

Figure 4:
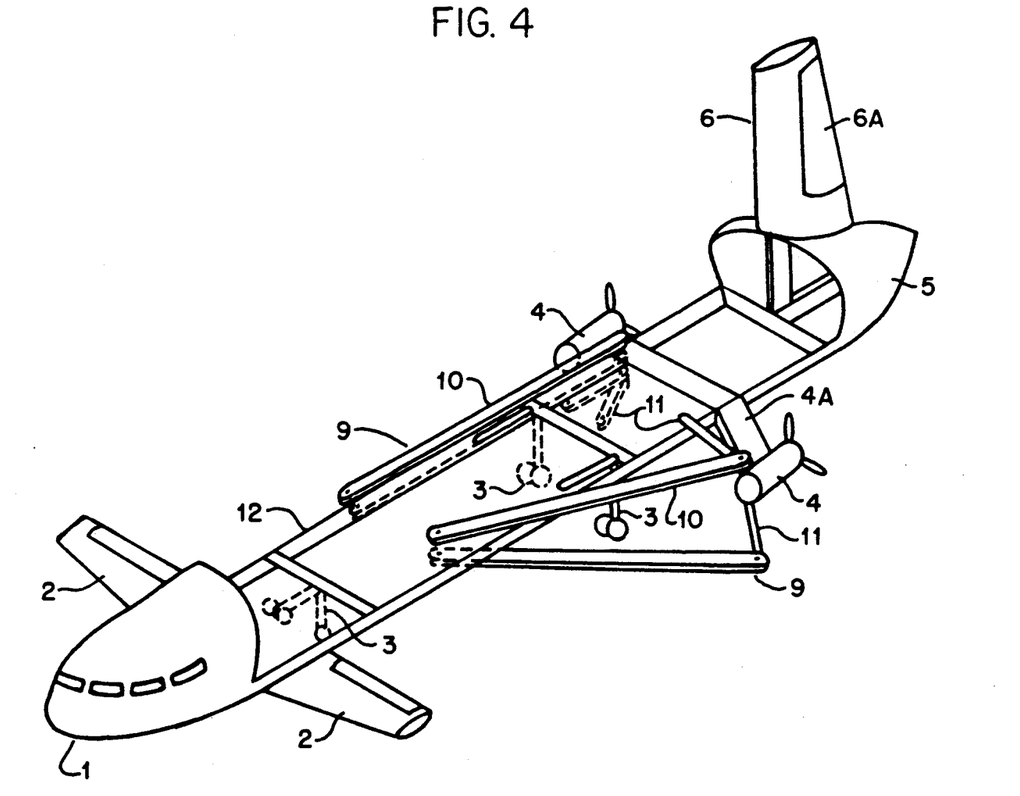
FIG. 4 is an illustration of the rigid frame system used in the present invention.
Figure 5A:
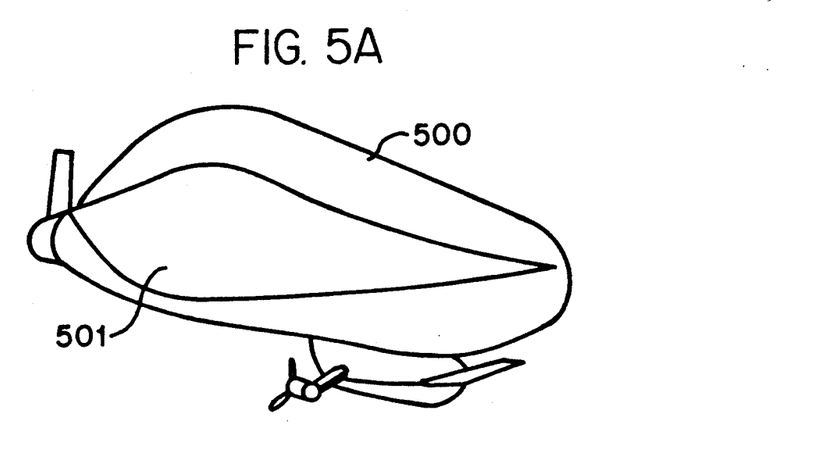
FIG. 5A and 5B are illustrations of another embodiment of the present invention.
Figure 5B:
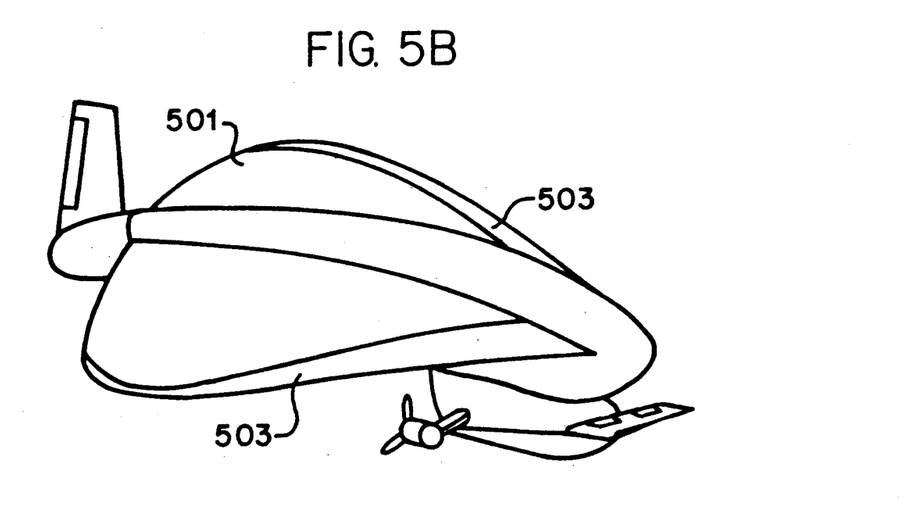

FIG. 4 is an illustration of the variable geometry airship's rigid frame system. FIG. 4 contains most of the elements depicted in FIGS. 1A and 1B. The crew cab 1 and horizontal stabilizers are as numbered in FIG. 1. The purpose of FIG. 4 is to depict the optional wing spars 9 and 10 which may rest inside the wing expansion sections of FIGS. 1-3 to allow these sections to be pivotally connected to the airframe. One of the advantages of the two wing spars 9 and 10 is that they allow the flexible wing expansion sections to be load bearing members that lift the airframe. As mentioned above, these wing spars should be considered optional since pneumatic pressure can also be used to create a tensile stress in certain designs of flexible wing expansion sections that would allow them to be load bearing wings without the metal wing spars. For example, the airship of FIGS. 5A and 5B is illustrated as having a flexible wing expansion section which forms a delta wing when inflated, and which requires no interior wing spars. This design is discussed in detail below.

The reader's attention is now directed towards FIGS. 5A and 5B, which are illustrations of another embodiment of the present invention. FIG. 5A illustrates the invention with its flexible envelope forming the ovoid shape characteristic of the airship configuration. In FIG. 5A, the airship is semibuoyant with about 90% of its lift coming from the helium in the envelope, and the remaining 10% derived from the air as it moves over the curved surface of the envelope.

In FIG. 5B, the flexible wing expansion sections have been inflated to form a delta wing configuration so that the system may operate as an aircraft. It is still a semibuoyant system, but a greater amount of lift is now derived from its wings. This conversion is made possible due to the design of the envelope as discussed below.

The present invention is designed so that the flexible gas envelope has a central chamber 500 that is separately inflated and deflated from the wing sections. The flexible wing expansion sections in FIG. 5B includes a primary airfoil chamber 501, and a leading edge 503 which are also separately controlled as follows. For operation as an airship (as a lighter-than-air craft as shown in FIG. 5A) both the central chamber 500 of the flexible gas envelope as well as the primary airfoil chambers 501 are completely filled with a sufficient volume of helium to lift the gross weight of the craft. Examples of volumes and weights of actual airships are provided in Table 1.

For operation as an aircraft, the leading edge chambers 503 are completely inflated to create a pneumatic tension that spreads the wing sections. While the leading edge chambers are being filled, the central chamber 500 and primary airfoil chamber 501 are deflated. This allows the primary airfoil chambers 501 to be spread by the leading edge chambers 503 into the delta wing configuration of FIG. 5B.

Figure 6A:
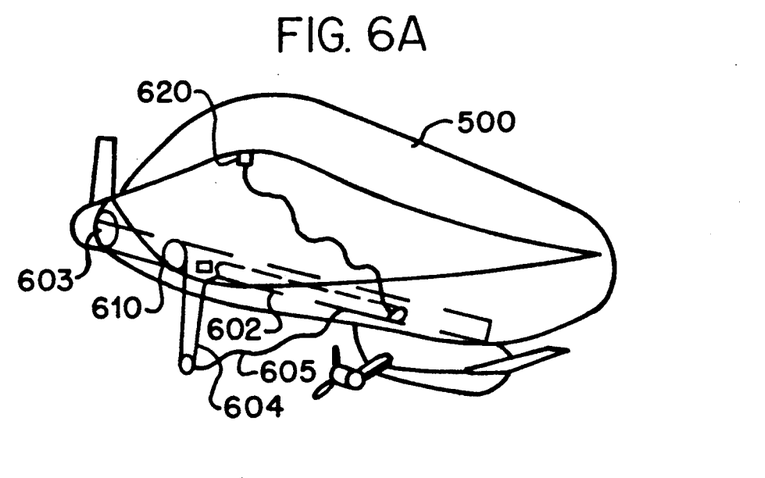
FIG. 6A is an illustration of the aircraft of FIG. 5B with the use of wing spars.

While the delta wing aircraft of FIG. 5B may be operated without wing spars to support the wings, the present invention does not preclude their use. FIG. 6A is an illustration of the aircraft of FIG. 5B which makes use of wing spars and steel cable support rigging in exactly the same manner as early hang gliders did. A more detailed description of the system of FIG. 6A is presented below.

Figure 6B:
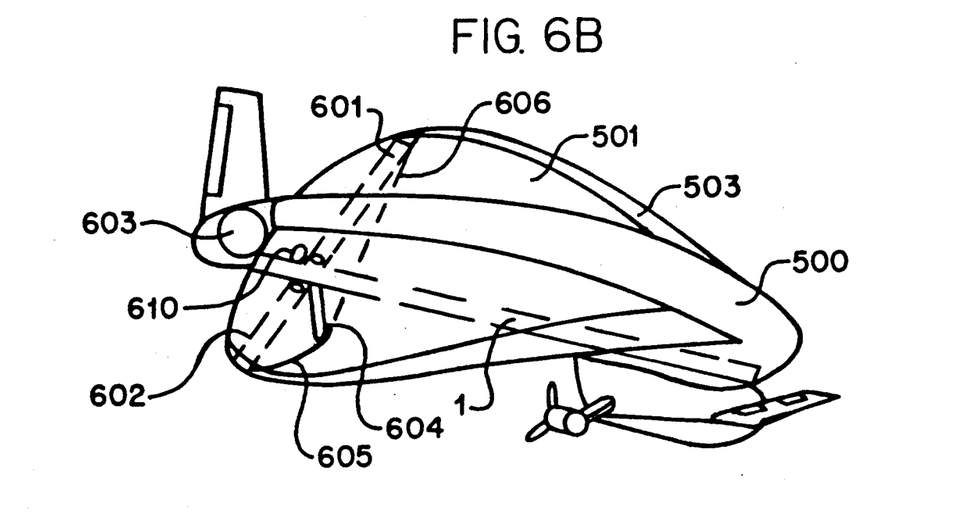
FIG. 6B is an illustration of the system of FIG. 5A with the use of wing spars.

In FIGS. 6A and 6B, the keel of the airframe 1 is depicted as having: two wing spars 601 and 602, two powered axles 603 and 610 and a king post 604 attached to it. The wing spars 601 and 602 are pivotally attached to the keel by a hinge that provides them with only one axis of rotation. As shown in FIG. 6B, the wing spars can be rotated forwards to become parallel with the keel, but they cannot be rotated upwards.

The wing spars span the width of the wings in the detail wing configuration to provide structural support for the wings when they are deployed. The method of deployment is discussed below.

The wing spars of FIGS. 6A and 6B each have a pulley on their outer edge. Through these pulleys run steel cables 605 and 606 which are each fixed to a tab 620 on the outer edge of the leading edges of the wings. These cables are routed through a pulley at the end of the king post and up to the powered cable 610. When the invention is used as an airship as shown in FIG. 6B, both of the cables 605 and 606 are unwound from the powered axel to allow the wing spars 601 and 602 to be folded parallel to the keel, and to allow the flexible envelope to assume the ovoid shape of a blimp.

When the aircraft is operated in the delta wing configuration, a series of operations are performed to convert the airship of FIG. 6B into the aircraft of FIG. 6A. First, the central chamber 500 and primary airfoil chamber 501 are substantially deflated, while the leading edge chambers are inflated by copressors in the airframe. Second, both powered axels 603 and 610 are operated to respectively wind in the steel support cables 605, 606 as well as the slack in the central chamber 500 of the flexible gas envelope.

When the wing spars 601 and 602 are rotated out and the leading edge chambers 503 on each side of the aircraft are fully inflated, the delta wing configuration of FIG. 6A provides the aircraft with wings which provide the craft with sufficient lift to make up for the lost buoyancy of the deflation of the central chamber 500 and primary airfoil chamber 501.

Some of the advantages of the variable geometry airship are as follows. First, when the airship is on a mission which requires a long airborn duration, an airship has an advantage over an airplane since the airship's lift is derived from buoyancy. This allows an airship to conserve fuel.

The advantage that an airplane has over an airship is that an airplane can move much faster than an airship. The variable geometry airship to the present invention combines the advantages of both the airship with those of the airplane, since the invention can be converted back and forth between these two alternative configurations as described above.

Figure 7:
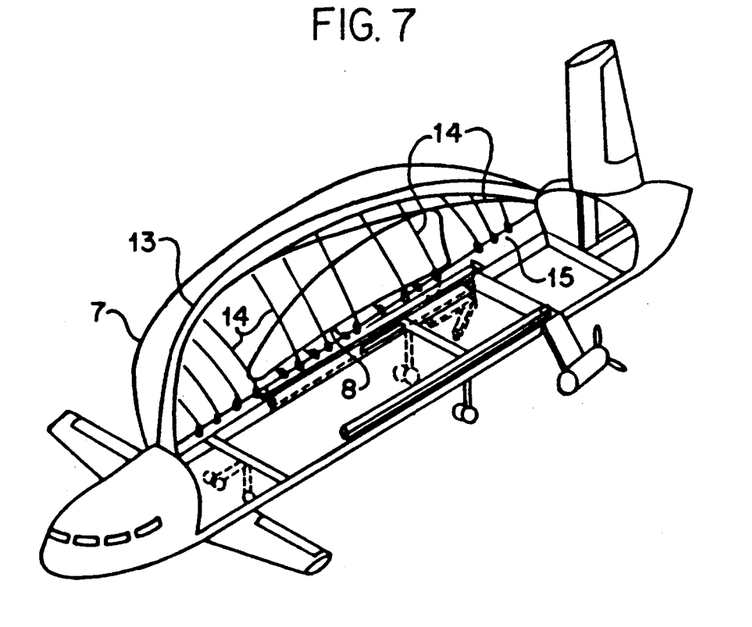
FIGS. 7 and 8 are illustrations which respectively depict the use of the catenary curtain in the airship configuration and the aircraft configuration.
Figure 8:
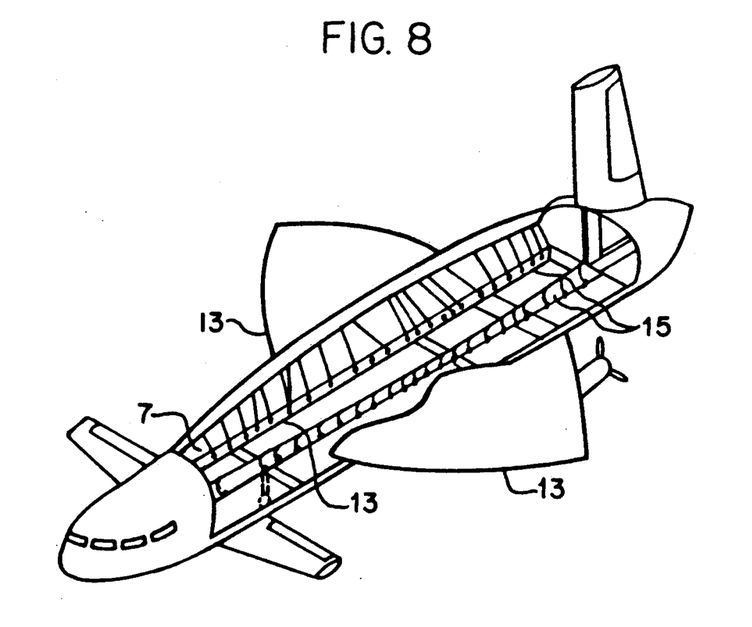

The reader's attention is now directed towards FIGS. 7 and 8 which are illustrations which respectively depict the use of the catenary curtain to control the geometry of the invention in the airship configuration (FIG. 7) and in the aircraft configuration (FIG. 8). Many of the elements in FIGS. 7 and 8 are identical with that of FIGS. 1A and 1B, and these need not be redescribed.

The catenary curtain B has two basic functions. First it is used to attach the flexible envelope 7 to the rigid frame of the airship. In performing this function, the catenary curtain acts as a supporting net with a mesh that encompasses the buoyant flexible envelope in exactly the same manner as that the catenary net of a balloon.

The second function of the catenary net 13 is to adjust the envelope geometry in the conversion of the invention between an airship to an aircraft. This adjustment of the envelope geometry is facilitated using sets of adjusting lines 14 which function as described below.

As shown in FIG. 7, the catenary curtain 13 is connected to the airship frame 1 by the adjusting lines 14. Each of these adjusting lines are connected to one of the axle and take up drum assemblies 15. These assemblies are fixed to the frame and operate just like the powered axle 610 of FIGS. 6A and 6B. More specifically, each of the axle and drum assemblies include an individually operated electric motor which winds and unwinds one of the adjusting lines around an axle to shorten or lengthen it as required. When all of the adjusting lines are fully unwound and at their maximum length, the catenary curtain 13 will allow the flexible envelope 7 to assume the familiar ovoid shape of an airship as long as the envelope is fully inflated by the buoyant gas.

As shown in FIGS. 7 and 1A, the wing expansion sections 8 are either deflated, or are only partially inflated when they are retracted and the airship is in the lighter-than-air configuration. For conversion to a heavier-than-air airplane, the wing sections 8 are fully inflated and extended as discussed above in conjunction with the description of FIG. 2. This description is elaborated on in the discussion that follows.

As shown in FIG. 2, the wing section may be inflated by the pressure source 38. In terms of the present invention, this pressure source includes a pump and a supply of buoyant gas. When inflated, the wing section will reach full distention and provide a curved airfoil which will provide lift to the aircraft as described above. The wing section will be semi-rigid as a result of turgor. Additional support may be provided by either internal wing spars, a dorsal king post system (as shown in FIGS. 6A and 6B) or a compunction of both wing spars and a king post system.

Once the wing sections are in place and the aircraft is moving forward, the flexible gas envelope may be partially and retracted. The amount of deflation of the envelope should be commensurate with the amount of lift provided by the wing sections. As mentioned above, one thousand cubic feet of helium gas will lift about sixty-two pounds. Therefore, for every sixty two pounds of lift provided by the wings, the flexible gas envelope may be deflated by about one thousand cubic feet of gas. The advantages of the present invention are discussed below.

The buoyant airship can potentially fly missions that last indefinately while airplanes would consume vast amounts of fuel. Airplanes have the advantage of speed over airships. The convertible aircraft has the advantage of both the duration of an airship, and the speed advantage of an airplane.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. A variable geometry aircraft comprising:
an airship frame;
a flexible gas envelope which is fixed to said airship frame and which may be inflated with a buoyant gas to provide buoyant lift to said variable geometry aircraft;
a means for providing a variable aerodynamic lift to said variable geometry aircraft, said providing means being fixed to said airship frame; and said variable geometry aircraft being capable of changing its geometric shape from an ovoid shaped lighter than air airship to a winged shaped heavier than air airplane.

2. A variable geometry aircraft, as defined in claim 1, wherein said providing means comprises:

a means for variably propelling said variable geometry aircraft with a forward thrust, said variably propelling means being fixed to said airship frame and providing increased lift as said forward thrust is increased;

a means for extending and retracting curved wing sections out from said variable geometry aircraft to provide said variable aerodynamic lift thereby, said variable aerodynamic lift being increased as said curved wing sections are extended, said variable dynamic lift being decreased as said curved wing sections are retracted.

3. A variable geometry aircraft, as defined in claim 2, wherein said extending and retracting means comprises:

a plurality of flexible wing expansion sections which are fixed to said airship frame, and which may be inflated to extend said curved wing sections, and which may be deflated to retract said curved wing sections;

a means for inflating said plurality of flexible wing expansion sections; and a means for supporting said plurality of flexible wing sections when they are extended, said supporting means being connected to said airship frame and said plurality of flexible wing sections so that it can fix said plurality of flexible wing sections in place when they are extended and thereby enhance the aerodynamic lift they generate in the presence of said forward thrust.

4. A variable geometry aircraft, as defined in claim 3, wherein said supporting means comprises:

a plurality of wing spars which are pivotally connected on an inner end to said airship frame, and each of which have an outer end;

a king post which is fixed to said airship frame and projects in a direction which is approximately perpendicular to said plurality of wing spars when they are extended;

a set of steel cables, each of which is fixed to an outer end of one of said flexible wing sections, and which is threaded through the outer end of one of the wing spars such that when it is taut it fixes the outer end of a flexible wing section to an outer end of a wing spar, each of said steel cables being threaded through said king post and having an inner cable length which is fixed to said airship frame; and a means for adjusting the inner cable length of each of said set of steel cables, said adjusting means being fixed to said airship frame and being connected to said inner cable length of one of said steel cables and being capable of winding up said inner cable length to shorten its effective length and unwinding said inner cable length to lengthen its effective length.

5. A variable geometry aircraft, as defined in claim 4, wherein each of said wing spars has a pulley fixed to its outer end through which one of said steel cables is threaded.

6. A variable geometry aircraft as defined in claim 4, wherein said adjustive means comprises a plurality of motor driven axles which are each fixed to said airship frame and to the inner cable length of one of said steel cables to wind and unwind it as required.

7. A variable geometry aircraft, as defined in claim 6, in which said variable propelling means comprises motor driven propellor system which is fixed to said airship frame, and which provides said forward thrust with amounts of thrust that are varied as its motor speed is varied.

8. A variable geometry aircraft, as defined in claim 1, wherein said flexible gas envelope is partially deflated by a measured amount after said providing means is deployed, said measured amount being a measure of said buoyant gas which provides a buoyant lift which approximately equals the aerodynamic lift provided by said providing means.

9. A variable geometry aircraft, as defined in claim 2, wherein said flexible gas envelope is partially deflated by a measured amount after said providing means is deployed, said measured amount being a measure of said buoyant gas which approximately equals the aerodynamic lift provided by said providing means.

10. A variable geometry aircraft, as defined in claim 3, wherein said flexible gas envelope is partially deflated by a measured amount after said providing means is deployed, said measured amount being a measure of said buoyant gas which approximately equals the aerodynamic lift provided by said providing means.

11. A variable geometry aircraft, as defined in claim 4, wherein said flexible gas envelope is partially deflated by a measured amount after said providing means is deployed, said measured amount being a measure of said buoyant gas which approximately equals the aerodynamic lift provided by said providing means.

12. A variable geometry aircraft, as defined in claim 5, wherein said flexible gas envelope is partially deflated by a measured amount after said providing means is deployed, said measured amount being a measure of said buoyant gas which approximately equals the aerodynamic lift provided by said providing means.

13. A variable geometry aircraft, as defined in claim 6, wherein said flexible gas envelope is partially deflated by a measured amount after said providing means is deployed, said measured amount being a measure of said buoyant gas which approximately equals the aerodynamic lift provided by said providing means.

14. A variable geometry aircraft, as defined in claim 7, wherein said flexible gas envelope is partially deflated by a measured amount after said providing means is deployed, said measured amount being a measure of said buoyant gas which approximately equals the aerodynamic lift provided by said providing means.

15. A variable geometry aircraft, as defined in claim 14, wherein said buoyant gas is helium.

16. A variable geometry aircraft, as defined in claim 3 wherein said plurality of flexible wing expansion sections comprises:

a primary airfoil chamber which forms an ovoid shape when partially inflated, and which has a delta wing shape when flexible wing expansion sections are extended; and a pair of leading edge chambers which are attached to said primary airfoil chamber to form a leading edge of said delta wing shape when inflated and when said flexible wing expansion sections are extended, said pair of leading edge chambers being flaccid and deflated when said flexible wing expansion sections are retracted.

17. A variable geometry aircraft, as defined in claim 16, wherein said supporting means comprises:

a plurality of wing spars which are pivotally connected on an inner end to said airship frame, and each of which having an outer end;

a king post which is fixed to said airship frame and projects in a direction which is approximately perpendicular to said plurality of wing spars when they are extended;

a set of steel cables, each of which is fixed to an outer end of one of said flexible wing sections, and which is threaded through the outer end of one of the wing spars such that when it is taut it fixes the outer end of a flexible wing section to an outer end of a wing spar, each of said steel cables being threaded through said king post and having an inner cable length which is fixed to said airship frame; and a means for adjusting the inner cable length of each of said set of steel cables, said adjusting means being fixed to said airship frame and being connected to said inner cable length of one of said steel cables and being capable of winding up said inner cable length to shorten its effective length and unwinding said inner cable length to lengthen its effective length.

18. A variable geometry aircraft, as defined in claim 17, in which said adjusting means comprises a plurality of motor driven axles which are each fixed to said airship frame and the inner cable length of one of said steel cables to wind and unwind it as required.

19. A variable geometry aircraft, as defined in claim 18, wherein said flexible gas envelope is partially deflated by a measured amount after said providing means is deployed, said measured amount being a measure of said buoyant gas which provides a buoyant lift which approximately equals the aerodynamic lift provided by said providing means.

20. A variable geometry aircraft, as defined in claim 3, wherein said supporting means comprises a catenary curtain which is fixed to said flexible wing sections and to said airship frame to govern the shape of the flexible wing sections when they are deployed.

* * * * *